United States Patent [19]
Walker et al.

[11] Patent Number: 5,697,472
[45] Date of Patent: Dec. 16, 1997

[54] WEAR INDICATOR

[75] Inventors: Gordon L. Walker, Yorkville; Ronald E. Wintermute, Aurora; Richard J. Gibes; Robert D. Carlson, both of Plainfield; Neal L Woessner, Oswego; Charles T. Haymond, Aurora, all of Ill.

[73] Assignee: Caterpillar Inc., Peoria, Ill.

[21] Appl. No.: 599,013

[22] Filed: Feb. 9, 1996

[51] Int. Cl.⁶ .................................................. F16D 66/00
[52] U.S. Cl. ............................. 188/1.11 W; 188/71.5; 192/30 W
[58] Field of Search .............. 188/1.11 W, 71.5; 73/121, 132; 192/30 W

[56] References Cited

U.S. PATENT DOCUMENTS

| | | | |
|---|---|---|---|
| 3,376,959 | 4/1968 | Holcomb, Jr. et al. | 188/1.11 W |
| 4,186,822 | 2/1980 | Khuntia et al. | 188/1.11 W |
| 5,035,303 | 7/1991 | Sullivan | 188/1.11 W |

FOREIGN PATENT DOCUMENTS

| | | | |
|---|---|---|---|
| 2705179 | 8/1977 | Germany | 188/1.11 W |
| 2734786 | 2/1979 | Germany | 188/1.11 W |

OTHER PUBLICATIONS

Kawasaki Shop Manual, pp. 15–019, Model 115Z III.

*Primary Examiner*—Lee W. Young
*Attorney, Agent, or Firm*—William C. Perry

[57] ABSTRACT

This invention relates to an indicating apparatus to determine the amount of wear that has occurred in the friction material of a brake assembly or other friction coupling. The apparatus utilizes a pin member that is positioned in a sealed bore in the housing of the friction coupling. A first end portion of the pin member is positioned for contact and movement of an actuating piston when the piston is in an engaged position. The distance between the a second end portion of the pin member, housed within the bore, and an outer surface of the housing may be determined by a depth gage. Measurements may be taken to determine movement of the pin member within the bore and thereby establish the amount of wear of the friction material in the friction.

19 Claims, 3 Drawing Sheets

WEAR INDICATOR

TECHNICAL FIELD

This invention relates to wear indicators and more particularly to a wear indicator associated with a brake assembly that will accurately and conveniently provide a means to measure the amount of cumulative wear of the friction material in a brake assembly.

BACKGROUND ART

In the operation of construction machinery, it is quite common to utilize friction couplings in the brake system or in a clutch mechanism in the drive train. The friction coupling utilized in a brake system, for example, includes one or more discs that rotate within a brake housing between a brake piston and a reaction surface depending upon the braking force required by the particular machine. A single disc typically has a thickness of friction material bonded on each side thereof. When braking is desired, the piston is actuated, either by hydraulic or spring pressure, to move the piston against the friction disc thereby forcing it against the reaction surface. The piston and the reaction surface are typically mounted in stationary housings and the disc is mounted for rotation between them. The friction disc is mounted to a rotating member that is slowed down or completely stopped upon contact with the piston. The rotating member is usually a drive component in a final drive planetary or a drive shaft that, when braked in the manner described above, will control the rotative drive to the wheels of a machine. In the instance where multiple discs are utilized, a plurality of friction discs are mounted to a rotating member and are interleaved between stationary discs mounted to a housing. Actuation of the piston compresses all the discs against the reaction surface to control the rotation of the rotating member.

During the course of normal machine operation, application of the brakes occurs numerous times. In a design utilizing a single disc, for example, the friction disc is compressed between the piston and the reaction surface with a great deal of force resulting in the creation of a substantial amount of heat. As the brake system operates, the pressure and the heat will naturally act to wear the friction material from the disc. After a reasonable number of hours of machine operation, inspection of the brake system is performed to determine how much friction material is left and whether the friction discs need to be replaced.

In some instances, the entire brake mechanism must be torn down to visually inspect and measure the amount of friction material remaining. This is extremely costly in terms of manpower and machine downtime and often leads to the premature replacement of the friction discs. In other instances, a measuring device may be inserted into a housing to engage one or more of the brake discs to determine the wear of friction material from the disc. One such design is shown on page 15-019 of the Kawasaki Shop Manual for the Model 115Z III machine. In this design, a plurality of friction discs are mounted for rotation with a sun gear that rotates with a drive axle. The friction discs are interleaved between a plurality of stationary discs that are mounted to the final drive housing. The discs are positioned on an inboard side of a planet carrier that forms a reaction surface. A piston is positioned on the opposite side of the discs and, upon actuation, compresses the discs against the reaction surface. A measuring device, such as a slide caliper, may be inserted through a drain hole in the final drive housing and engage the friction disc on the far side of the disc pack. The caliper will be able to measure the amount of wear of the friction material as operation of the machine continues. While this method is an improvement over the disassembly of the final drive unit, it has several drawbacks. Since the hole through which the caliper is inserted is a drain hole, care must be taken to properly position the drain hole so that lubricant will not leak out of the housing. Also, since the hole is blind and the distance between the outer portion of the final drive case and the friction disc to be measured is substantial, accuracy can be sacrificed if the caliper is not lined up properly. Since the caliper must extend across several other plates, specific measures must be taken to insure the caliper bears against the proper friction disc. Still further, since the calipers are extending through the drain hole, the entire final drive cavity and the lubricant contained therein is exposed to possible contamination from debris or foreign matter that may enter through the drain hole. Finally, it must be noted that the brake piston must be actuated during all measurements. This in turn, will require an extra individual or other mechanical means to provide force behind the brake piston while another individual takes the measurement. This of course adds to the expense of maintaining and servicing the machine.

The present invention is intended to overcome one or more of the problems set forth above.

DISCLOSURE OF THE INVENTION

In one aspect of the present invention, a wear indicator is provided to measure the wear of a preselected thickness of friction material that is affixed on a friction disc. The friction disc is positioned for rotation between a first housing that defines a reaction surface and a second housing that has a piston member mounted therein. The piston member is mounted within the housing for movement between a first position wherein the piston is moved away from engagement with the friction disc and a second position wherein the piston member is moved toward the friction disc for contact with the rotating friction disc. The piston member forces the friction disc against the reaction surface on the opposite side of the friction disc. A bore is provided that extends through the first housing and opens onto an outer surface of the first housing. A pin member is housed within the bore in a manner wherein a first end portion extends from the bore and is adapted for contact with the piston member when the piston member is in its second position and a second end portion is positioned a preselected distance from the outer surface. The pin member is moveable by contact with the piston member to reposition the second end portion of the pin member with respect to the outer surface of the first housing as the thickness of the wear material on the friction disc is reduced. A measuring means is provided to measure the distance between the second end portion of the pin member and the outer surface of the housing.

In another aspect of the present invention, a method for determining the amount of wear of friction material in a friction coupling that has at least one friction disc is provided. The friction disc is mounted on a shaft that is received within a housing and is positioned for relative rotation between a piston member and a reaction surface defined by the housing. The piston member is moveable between a first position that is moved away from engagement with the friction disc and a second position wherein the piston is forcibly engaged with the friction disc to capture it against the reaction surface and thereby brake the rotation of the shaft. The steps of determining the amount of wear include: 1) defining a bore in the housing that has a first end portion opening onto an outer surface of the housing and a second end portion that is adjacent a portion of the piston member; 2) securing a pin member within the bore with a first end portion of the pin member adapted for contact with the piston member when the piston member is in its second position and a second end portion that is located within the bore, the pin member being secured within the bore in a manner wherein it is axially moveable only upon contact with the piston member; 3) measuring an initial distance between the second end portion of the pin member and the outer surface; 4) measuring a second distance between the second end portion of the pin member and the outer surface of the housing after a preselected amount of operation of the friction coupling; and 5) comparing the second distance with that of the initial distance to determine the amount of movement of the piston member and thereby the amount of friction material that has been worn away.

With a wear indicator as described above, the amount of friction material that has been consumed during the operation of a friction coupling, such as a clutch or a brake, may be readily determined with only the removal of a plug that closes the end of a bore in the housing. This eliminates the need for disassembly of any components to perform inspection and measurement functions, which can be very costly in terms of manpower and downtime of machinery.

BEST MODE FOR CARRYING OUT THE INVENTION

Figure 1:
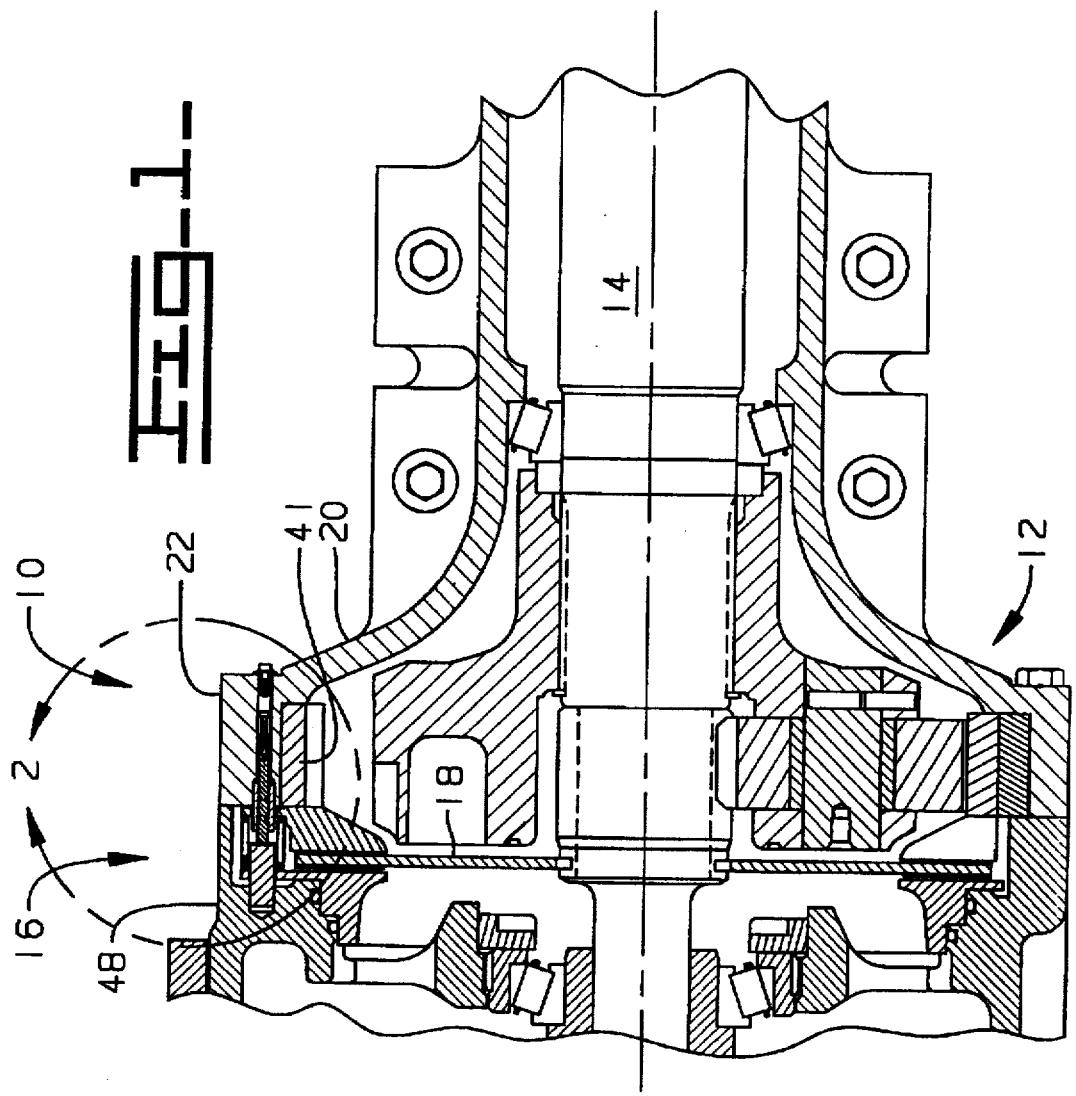
FIG. 1 is a diagrammatic partial section view of a brake assembly that embodies the principles of the present invention.

Referring now to the drawings, it can be seen that an indicating apparatus, shown generally at 10 is associated with a brake assembly 12. The brake assembly 12 is utilized to control the rotation of an axle shaft 14 (FIG. 1) that is centrally disposed within a housing assembly 16. The axle shaft 14 provides drive to a pair of wheel assemblies (not shown) for a machine in a typical manner. In the brake assembly 12 disclosed herein, a single brake disc 18 is fixed to the axle shaft 14 in a well known manner, such as a splined connection, for rotation with the axle shaft. While only a single disc is shown, it is to be understood that a plurality of discs may be incorporated within the brake assembly without departing from the intent of the invention. No matter how many brake discs are employed, each brake disc has a thickness of friction material 19 secured as by bonding or other suitable method, to one or both sides of the disc.

The housing assembly 16 is comprised of a pair of housing members that are joined together by suitable fasteners, such as bolts, to form an encasement for the brake assembly 12 and the axle shaft 14. A first housing member 20 defines an outer flange 22 through which extends a bore 24. A first end 26 of the bore 24 opens onto an outer surface 28 defined by the first housing member 20. The outer surface is a machined surface and serves as a reference for measurement as will be described hereinafter. The second end 30 of the bore 24 exits the first housing on an inner surface 32 thereof. The second end portion 30 of the bore 24 defines an enlarged diameter that receives a hollow dowel member 34. A first portion 36 of the hollow dowel is fixed within the bore, while a second portion 38 extends from the first housing member 20.

A reaction plate 40 is secured to the first housing member 20 in a manner to butt up against a ring gear 41 defined by the first housing member and defines a reaction surface 42. The reaction plate forms an outer flange 44 that has a bore 46 formed therein. The bore 46 is piloted on the second portion 38 of the hollow dowel 34 and is thereby retained from rotation.

A second housing member 48 is secured to the first housing member 20 as previously set forth and abuts against the inner surface 32 and defines a cavity 50 that encompasses the hollow dowel member 34. A bore 52 is formed in the second housing in the vicinity of the cavity 50 and a guide dowel 54 is secured within the bore 50 and is positioned in axial alignment with the hollow dowel 34.

Figure 2:
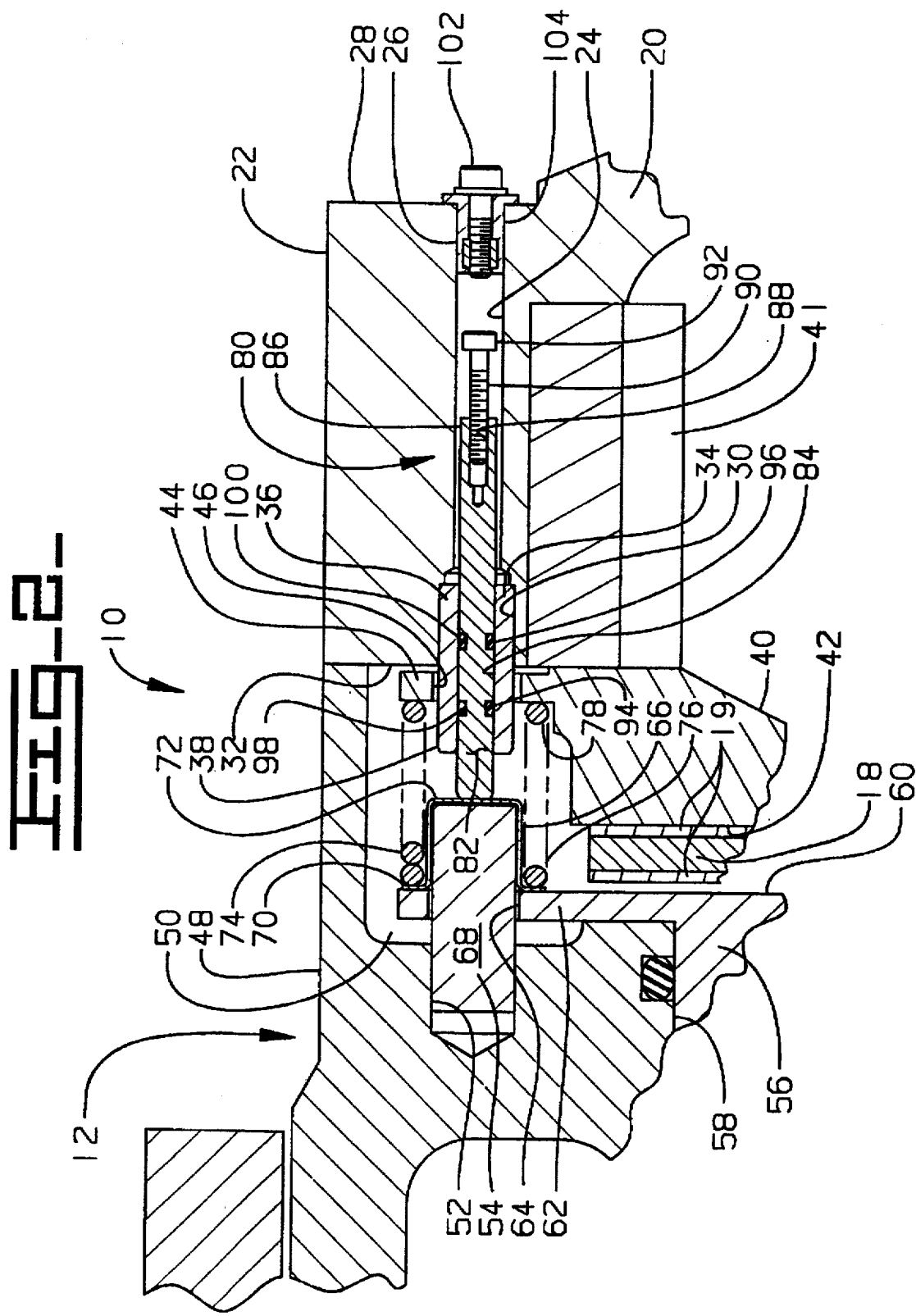
FIG. 2 is an enlargement of the area of FIG. 1 indicated by the numeral 2.

A piston member 56 is mounted within a stepped bore 58 formed in the second housing member 48. The piston member defines an engagement surface 60 and is positioned in a manner wherein the engagement surface 60 faces the reaction surface 42 of the reaction plate 40 and is spaced from the reaction plate a sufficient distance to accommodate the brake disc 18 which is positioned for rotation between the two members. The piston member is mounted for limited movement within the stepped bore 58. The piston is moveable toward a first position, away from the brake disc (FIG. 2), to allow uninhibited rotation of the brake disc, and toward a second position wherein it is engaged with the brake disc. When in its second position, the piston member is forced under hydraulic pressure or spring pressure, depending on the type of brake, against the reaction surface 42 to reduce or completely stop its rotation. The piston member defines an outer flange 62 that has a bore 64 that extends therethrough. The bore 64 is positioned to receive the guide dowel 54 which functions to prevent the piston member from rotating and also provides a guide for the piston member as it moves between its first and second positions.

A cup-shaped member 66 is positioned to encapsulate a distal end portion 68 of the guide dowel 54. The cup-shaped member defines a circumferential, radially directed flange 70 that is engaged with the outer flange 62 of the piston member. The end of the cup-shaped member defines an engagement surface 72 that is axially spaced from the circumferential flange 70 in a direction towards the first housing member 20.

A plurality of spring members 74 are positioned between the outer flange 44 and the piston member 56 to urge the piston member towards its first position. One return spring is specifically shown in FIG. 2 and has a first end portion 76 that is positioned about the cup-shaped member and is engaged with the circumferential flange 70. A second end portion 78 of the spring member 74 is positioned about the hollow dowel 34, the aligned dowels serving as guides for the springs 74. A pin member 80 is positioned within the bore 24 that extends through the first housing 20. A first end portion 82 is received within a bore 84 defined by the hollow dowel 34. The first end portion of the pin member 80 extends beyond the second end portion 38 of the hollow dowel and is positioned for engagement with the engagement surface 72 of the cup-shaped member 66. A second end portion 86 defines a threaded bore 88 that receives an adjusting stem 90. The adjusting stem has a head portion 92 that is moved axially within the bore 24 relative to the outer surface 28 of the first housing 20 as it is threaded in and out of bore 88 of the pin member 80. A pair of grooves 94 and 96 are formed in the first end portion 82 of the pin member in the vicinity of the portion that will be positioned within the hollow dowel 34. The grooves are axially spaced from one another along the length of the pin member and are adapted to receive a pair of O-rings 98 and 100. The O-rings have a diameter that is large enough that will require them to become compressed when they are in their installed condition within the bore 84 of the hollow dowel. In this condition, they provide enough friction between the pin member and the bore 84 to prevent the random movement of the pin member with respect to the bore 84. In fact the only movement of the pin member will occur through contact of the pin member with the cup-shaped member which will in turn move with the piston member as it moves toward its second position. In addition to locating the first end portion 82 of the pin member within the bore 84 the O-rings serve to seal the communication of foreign matter from outside the first housing 20, through the bore 24, to the cavity 50 which forms a portion of a reservoir of lubricating oil.

The first end portion 26 of the bore 24 is closed off by a closure element 102 that may take the form of an expansion type plug 104 having a well known design. The plug 104 functions to close off and seal the bore upon expansion of the body of the plug as the which occurs as a mounted bolt, located within the body, is rotated.

Figure 4:
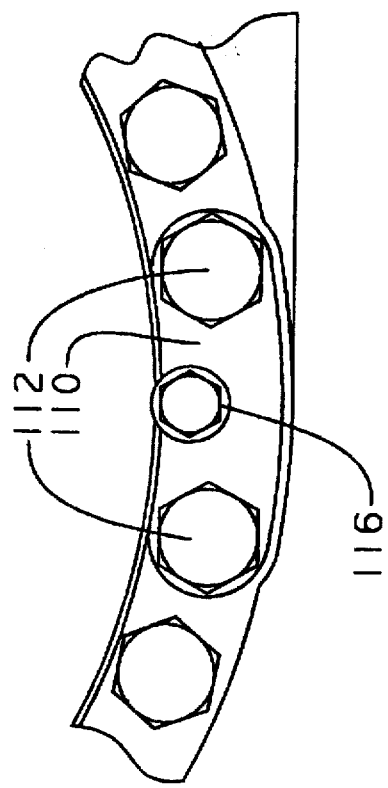
FIG. 4 is an end view of the closure element shown in FIG. 3 taken along lines 4—4 of FIG. 3.
Figure 3:
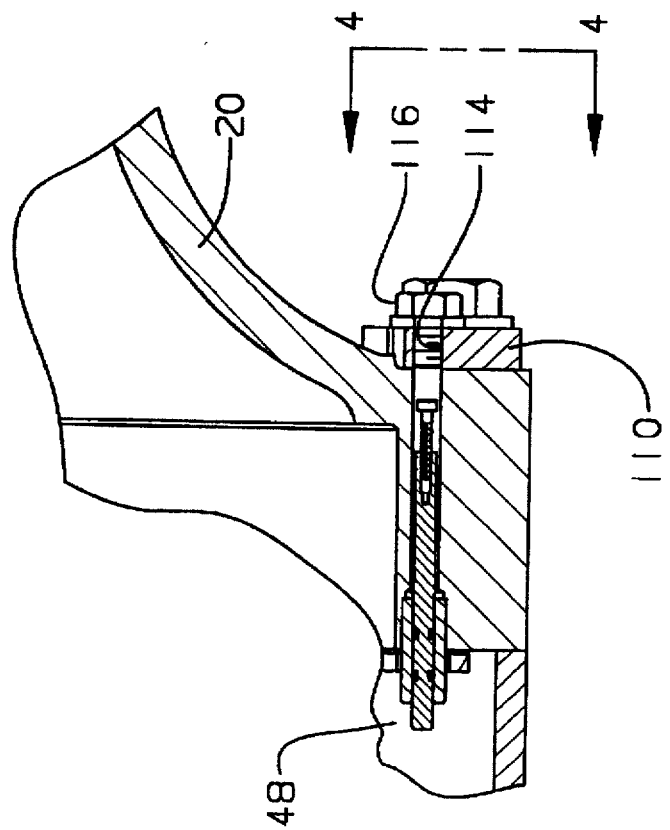
FIG. 3 is an alternate embodiment of a closure element utilized in the present invention.

An alternate embodiment of a plug assembly is shown in FIGS. 3 and 4. In this embodiment, a crescent-shaped plate 110 is secured between a pair of mounting bolts 112 that secure the first and second housing members 20 and 48 together. The plate 110 has a threaded hole 114 formed therein that is aligned with the bore 24. A plug 116, preferably comprising a metal bolt with a plastic washer, is threaded into the hole 114 to close off access to and seal the bore and the pin member 80. The plate 110 abuts the outer surface 28 of the first housing and a sealant is applied between the two surfaces to provide a seal therebetween.

Industrial Applicability

Upon initial assembly or just after a rebuild of the brake system wherein new friction discs are incorporated, the initial set up of the indicating apparatus takes place. With the bore 24 open to access from outside the first housing 20, the pin member 80 is inserted into the bore 24 with the first end portion 82 of the pin member positioned within the bore 84 defined by the hollow dowel 34. The O-rings 98 and 100 create enough friction between the bore 84 and the pin assembly to hold the axial position of the pin member. The pin member is pushed into the bore 24 until the distal end of the first end portion 82 of the pin member contacts the engagement surface 72 of the cup-shaped member 66. With the initial application of the brakes, the brake piston will move to its second position to sandwich the brake disc against the reaction surface 42 of reaction plate 40. As the piston member moves (leftward as viewed in the drawings) the cup-shaped member and the pin member 80 will be carried with it. When the brakes are released, the piston member will be returned to its first position by the return springs 74. Even though the piston member is returned to its first position, the pin member will remain in place by virtue of the O-rings 98 and 100. This creates an initial contact point that is established when the friction material 19, bonded to the brake discs is at a maximum thickness. In the preferred embodiment, the adjusting stem 90 may then be rotated with respect to the second end portion 86 of the pin member 80 to move it axially with respect to the bore 24. The adjusting stem is rotated until the head portion 92 is positioned at a preselected point with respect to the outer surface 28 of the first housing 20. This will account for any stack up in tolerances within the brake assembly 12 which will vary from assembly to assembly. A depth gage maybe used to measure the distance between the outer surface 28 and the head portion 92 to insure the head portion of the adjusting stem is properly located. After the adjusting stem is properly located, a commercially available fixative, such as one marketed under the name Thread Loc, is applied to the threads of the adjusting stem 90 to lock the position of the adjusting stem with respect to the pin member 80.

As the brake assembly is actuated and the piston member 56 is moved between its first and second positions, the thickness of friction material 19 is gradually reduced. Each time there is a reduction in the thickness of the material, the piston member 56 will be allowed to move a little further to the right as viewed in the drawings. As the piston member moves further to the right, the pin member 80 will be carried with it to reposition it within the bore 24.

After a reasonable number of hours of operation, it is common practice to check the brake assembly 12 to determine how much friction material is left. To accomplish this task, the closure element 102 is removed from the first end portion 26 of the bore 24 to gain access to the bore. A depth gage is then inserted into the bore to measure the distance between the head portion 92 of the adjusting stem 90 and the outer surface 28 of the bore 24. In order to determine the wear of the friction material bonded to the friction disc, the second measurement need only be subtracted from the initial measurement taken when the head portion of the pin member 80 was in the preselected location. The total wear of the brake assembly may then be compared to an acceptable wear criteria and service of the brake assembly may then be scheduled if necessary.

Another embodiment of this invention would involve the same components as previously described, the only difference being a one-piece pin member 80 instead of one having an adjustable stem 90. When using a one-piece pin member, the installation steps are identical with those set forth above with respect to seating the pin member. Since the second end portion of the pin member is not adjustable, a depth gage may be used to determine the distance of the second end portion of the pin from the outer surface 28. This distance must be recorded in a service log or by stamping on the outer surface 22. After a preselect number of service hours of the braked assembly, the second measurement may be taken as previously described. The second measurement can then be compared with the initial measurement to determine the necessary action.

With a wear indicating apparatus 10 as set forth above, the amount of wear incurred by the friction material in a brake assembly 12 may be determined quickly and easily without having to gain access to the brake assembly for a visual inspection. In addition, the bore 24, through which access to the indicating apparatus is gained, is sealed. This allows the necessary measurements to be taken regardless of the position of the access bore with respect to the reservoir or lubricant stored within the housing assembly 16. Also, the sealed condition between the pin member 80 and the hollow dowel 34 prevents any contaminants or foreign matter from entering the reservoir during the inspection measurement.

Other aspects, objects and advantages of this invention can be obtained from a study of the drawings, the disclosure and the appended claims.

We claim:

1. In a stationary housing having a reaction surface defined therein and at least one friction disc positioned for rotation therewithin between the reaction surface and a piston member mounted within the housing for movement between a first position wherein the piston member is moved away from engagement with the friction disc and a second position wherein the piston member is moved into engagement with the friction disc to capture it against the reaction surface of the housing, an indicating apparatus comprising:
   a bore extendible through the housing, said bore having a first end portion opening onto an outer surface of the housing and a second end portion positioned adjacent the piston member; and
   a pin member housed within the bore of the housing, said pin member having a first end portion extending from the second end portion of the bore to a position that is adjacent the piston member and a second end portion that is positioned within the bore a preselected distance from the outer surface, said pin member being adapted for contact with the piston member only when the piston member is in its second position, said pin member being moveable by the piston member to reposition the second end portion of the pin member with respect to the outer surface of the housing as the amount of friction material on the friction disc is reduced.

2. The indicating apparatus as set forth in claim 1 wherein a guide dowel is mountable within the housing and being positionable within a bore defined by the piston member to guide the movement of the piston member between its first and second positions.

3. The indicating apparatus as set forth in claim 1 wherein a cup-shaped member is positioned in overlying relation to the guide dowel and has a circumferential flange that is engageable with the piston member and an engagement surface axially spaced from the circumferential flange, said engagement surface being brought into contact with the first end portion of the pin member, when the piston member is moved to its second position.

4. The indicating apparatus as set forth in claim 3 wherein a hollow dowel defining a centrally disposed bore is secured within the bore defined by the housing and is positioned in axial alignment with the guide dowel.

5. The indicating apparatus as set forth in claim 4 wherein the pin member is positioned within the centrally disposed bore of the hollow dowel.

6. The indicating apparatus as set forth in claim 5 wherein the second end portion of the pin member includes an adjusting stem that is threadably received within an axial bore defined by the pin member, said adjusting stem being rotatable with respect to the first end portion of the pin member to adjust the distance of the second end portion with respect to the outer surface of the housing member.

7. The indicating apparatus as set forth in claim 5 wherein the pin member defines a pair of O-ring grooves that are spaced apart in an axial direction along an outer surface of the pin member, said O-ring grooves being adapted to receive a pair of O-rings that are captured between the pin member and the bore of the hollow dowel to maintain the position of the pin member within the hollow dowel in absence of contact between the first end portion of the pin member and the engagement surface of the cup-shaped member and to provide a seal between the outer surface of the housing and the second end portion of the bore.

8. The indicating apparatus as set forth in claim 1 wherein a closure means is positioned in the first end portion of the bore defined in the housing.

9. A indicating apparatus adapted for use with a brake assembly having a first housing having a bore defined therethrough, said bore opening onto an outer surface defined by the first housing, a reaction plate secured to the first housing, a second housing mounted to the first housing to encase a shaft member having at least one disc member having a preselected thickness of friction material secured to at least one side thereof mounted thereon and being rotatable with respect to the housings, a piston member mounted within the second housing in a manner to be located adjacent the disc member and being moveable between a first position wherein it is retracted from contact with the disc member and a second position wherein it is forced into contact with the disc member to sandwich the disc member between the piston member and the reaction plate, comprising:
   a pin assembly positionable within the bore defined by the first housing, said pin assembly having a first end portion adapted for contact with the piston member when it is in its second position and a second end portion that is positionable within the bore and is adjustable with respect to the first end portion to a preselected distance from the outer surface of the first housing, said pin assembly being moveable with respect to the outer surface of the first housing by the piston member only when it is in its second position as the thickness of friction material on the disc member is reduced; and
   means to measure the distance between the second end portion of the pin member and the outer surface of the first housing to determine the reduction in the thickness of the friction material.

10. The indicating apparatus as set forth in claim 9 wherein a guide dowel is mountable in the second housing to provide guidance of the piston member as it moves between its first and second positions.

11. The indicating apparatus as set forth in claim 10 wherein a cup-shaped member is positioned in overlying relation to the guide dowel and has a circumferential flange that engages the piston member and an engagement surface that is axially spaced from the circumferential flange.

12. The indicating apparatus as set forth in claim 11 wherein a spring member has a first end portion engageable with the circumferential flange of the cup-shaped member and a second end portion engageable with the first housing to urge the piston member toward its first position and out of engagement with the piston member.

13. The indicating apparatus as set forth in claim 12 wherein the first end portion of the pin member is positioned for contact with the engagement surface defined by the cup-shaped member when the piston member is in its second position.

14. The indicating apparatus as set forth in claim 13 wherein a hollow dowel is positioned in a second end portion of the bore defined in the first housing, said hollow dowel defining a bore that is adapted to receive the pin member for limited axial movement with respect thereto.

15. The indicating apparatus as set forth in claim 14 wherein said hollow dowel is positioned to extend from the first housing, said hollow dowel being positioned for alignment with the guide dowel defined by the second housing and being adapted for receipt within a second end portion of the return spring member.

16. The indicating apparatus as set forth in claim 14 wherein an adjustable stem is received within the pin member defines a head portion that is axially adjustable with respect to the first end portion of the pin member and the outer surface of the first housing.

17. The indicating apparatus as set forth in claim 14 wherein at least one O-ring is positioned between the pin member and the bore defined by the hollow dowel to secure the position of the pin member in absence of contact between the first end portion of the pin member and the engagement surface of the cup-shaped member.

18. The indicating apparatus as set forth in claim 17 wherein a pair of O-rings are positioned between the pin member and the bore defined in the hollow dowel to provide a seal between the outer surface defined by the first housing and the second end portion of the bore defined by the first housing.

19. A method for determining the amount of wear of friction material in a friction coupling having at least one friction disc mounted on a shaft that is received within a statonary housing and is positioned for rotation between a piston member and a reaction surface defined by the housing, said piston member being moveable between a first position that is moved away from engagement with the friction disc and a second position wherein the piston member is forcibly engaged with the friction disc to capture it against the reaction surface and thereby brake the rotation of the shaft, comprising the steps of:

defining a bore in the housing that has a first end portion opening onto an outer surface of the housing and a second end portion that is adjacent a portion of the piston member;

securing a pin member for limited axial movement within the bore, said pin member having a first end portion adapted for contact with the piston member only when the piston member is in its second position and a second end portion that is located within the bore, said pin member only being axially moveable within the bore only upon contact with the piston member;

measuring an initial distance between the second end portion of the pin member and the outer surface;

measuring a second distance between the second end portion of the pin member and the outer surface of the housing, said second distance being obtained after a preselected amount of operation of the friction coupling; and comparing the second distance with that of the initial distance to determine the amount of movement of the piston member and thereby the amount of friction material that has been worn away.

* * * * *